United States Patent
Hajj et al.

(10) Patent No.: US 7,203,305 B1
(45) Date of Patent: Apr. 10, 2007

(54) METHOD, SYSTEM, AND STORAGE MEDIUM FOR PROVIDING WEB-BASED QUALITY ASSESSMENT, TRACKING, AND REPORTING SERVICES FOR CALL MONITORING

(75) Inventors: James L. Hajj, Chamblee, GA (US); Scott M. Berger, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 763 days.

(21) Appl. No.: 10/648,424

(22) Filed: Aug. 25, 2003

(51) Int. Cl.
*H04M 3/00* (2006.01)
*H04M 5/00* (2006.01)

(52) U.S. Cl. .............................. 379/265.06; 379/265.09
(58) Field of Classification Search ................ 379/265.01–266.1, 309; 709/223–227
See application file for complete search history.

(56) References Cited

U.S. PATENT DOCUMENTS

| 6,058,163 | A  | * | 5/2000  | Pattison et al. ........ 379/265.06 |
| 6,263,049 | B1 | * | 7/2001  | Kuhn ....................... 379/32.01 |
| 6,470,386 | B1 | * | 10/2002 | Combar et al. ............. 709/224 |
| 2005/0216421 | A1 | * | 9/2005 | Barry et al. .................. 705/64 |

* cited by examiner

*Primary Examiner*—Benny Quoc Tieu
(74) *Attorney, Agent, or Firm*—Cantor Colburn LLP (57) ABSTRACT

Embodiments of the invention relate to a method, system, and storage medium for providing web-based quality assessment, tracking, and reporting services for call monitoring. The method includes providing quality assessment services relating to call monitoring by presenting a call monitor form template over a web-based network to a call monitor system in response to a request to evaluate a call representative. The call monitor form template contains data entry fields for identifying a call being monitored, a customer initiating the call, and a call representative receiving the call. The call monitor form template also includes initiatives and scoring data fields for receiving evaluation data from the call monitor system. The method further includes receiving a completed call monitor form over the web-based network, and making the completed call monitor form accessible to authorized individuals over the web-based network. Other embodiments include a system and a storage medium.

37 Claims, 5 Drawing Sheets

METHOD, SYSTEM, AND STORAGE MEDIUM FOR PROVIDING WEB-BASED QUALITY ASSESSMENT, TRACKING, AND REPORTING SERVICES FOR CALL MONITORING

BACKGROUND OF THE INVENTION

The present invention relates generally to quality monitoring activities, and more particularly, the invention relates to a method, system, and storage medium for providing web-based quality assessment, tracking, and reporting services for call monitoring.

Call centers are widely known and utilized in providing customer services such as product/service ordering, product/service information, repairs, billing questions, and troubleshooting. In today's multi-media technology environment, these services are being provided not only by telephone, but electronically through digital media as well. Customers value the flexibility in determining what communications channel they prefer for contacting a call center. Large businesses, particularly global enterprises, often outsource their call centers to one or more third parties who can provide these customer services, freeing up valuable resources for the businesses to focus on their industry.

Call monitoring occurs where a provider of customer services wishes to perform quality control functions in order to train and evaluate customer representatives of the call center and to ensure customer satisfaction. Automated call distribution systems (ACDs) provide the functionality that allows call monitors to listen in on live or recorded calls for monitoring purposes. The call monitor then provides feedback to the call representative or representative supervisor. This feedback is generally performed manually in the form of hand written or typed evaluation forms.

It is clear that such a system for monitoring calls and providing feedback would not be feasible for large global enterprises and businesses that outsource their customer services.

What is needed, therefore, is a way to provide efficient call monitoring services for large businesses that outsource their customer service activities and for global enterprises that require widespread geographic monitoring of customer services.

SUMMARY OF THE INVENTION

Embodiments of the present invention include a method, system, and storage medium for providing web-based quality assessment, tracking, and reporting services for call monitoring activities. The method includes providing quality assessment services relating to call monitoring by presenting a call monitor form template over a web-based network to a call monitor system in response to a request to evaluate a call representative. The call monitor form template contains data entry fields for identifying a call being monitored, a customer initiating the call, and a call representative receiving the call. The call monitor form template also includes initiatives and scoring data fields for receiving evaluation data from the call monitor system. The method further includes receiving a completed call monitor form over the web-based network, and making the completed call monitor form accessible to authorized individuals over the web-based network. Embodiments also include a system and storage medium.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF THE INVENTION

Figure 1:
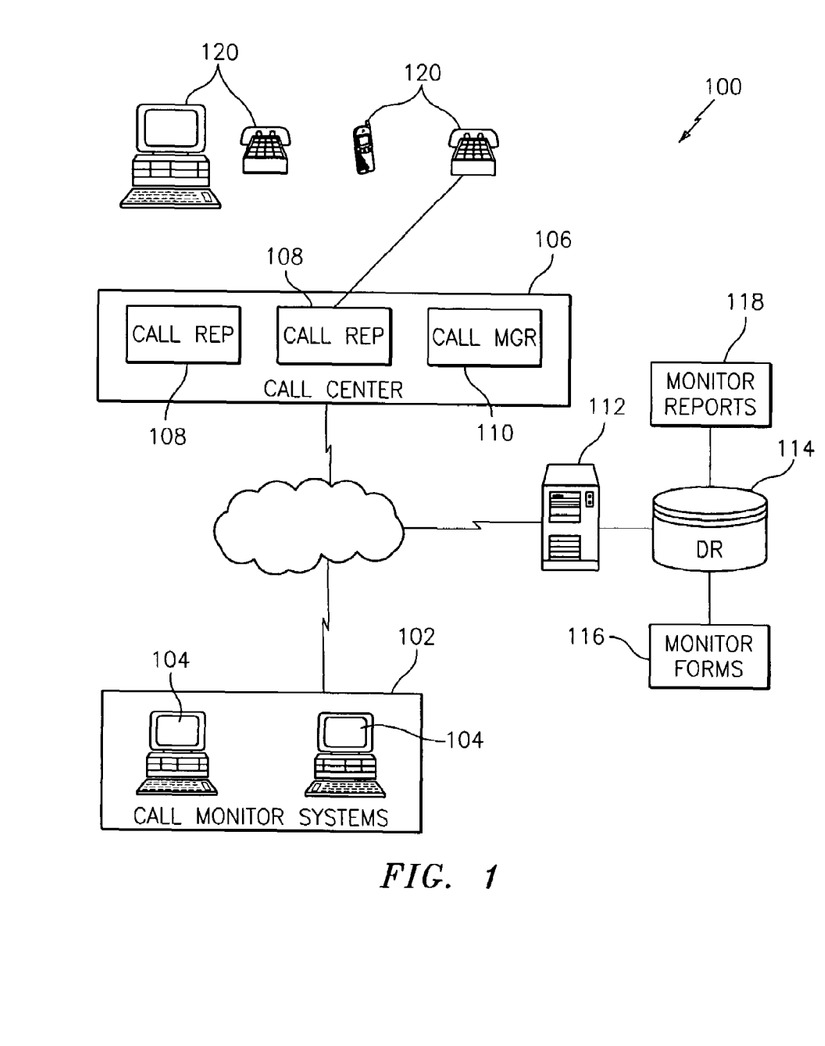
FIG. 1 is a block diagram of a system upon which the evaluation services system is implemented in exemplary embodiments.

The customer services provided in system 100 of the invention may include any multi-media communications or channels and may be implemented over any functionally compatible networking infrastructure. Customer services include product/service ordering, repairs, billing queries, technical assistance and troubleshooting, etc. Call monitoring of these customer services is performed over a network such as system 100 whereby call monitor systems 104 contact call center 106 and evaluate incoming calls from customers, either live or recorded. Call monitor systems 104 access the evaluation services system over the World Wide Web (WWW), retrieve monitor form templates 116 based upon initiatives established for the type of call center being monitored, and enter data into the form 116 which is then saved and retrievable via the Web.

Embodiments include a business enterprise 102 that outsources its customer services to third parties whereby a call center such as call center 106 represents a vendor providing these customer services on behalf of the business enterprise 102. Business enterprise 102 represents any entity or establishment that provides or is positioned to provide customer services in the form of sales, billing, technical assistance, telemarketing, and related assistance.

Call center 106 represents a source of information for external customers. Call center 106 may operate multi-media enabled automatic call distribution service (hereinafter referred to as "ACD service") that utilizes computer telephony integration (CTI) technology. The ACD component of call center 106 incorporates analog transmissions with digital data via switching technologies and routing devices that provides automatic distribution of incoming calls to individual representative systems 108. In this manner, communications from customers to the call center 106 can be accomplished in voice, data, or both.

Call monitor systems 104 may comprise general-purpose computer devices such as workstations. Call monitor systems 104 are web-enabled; that is, they include web browser technology for accessing web pages over the WWW such as from server 112. Call monitor systems 104 are in communication with call center 106 and may conduct live or recorded monitoring sessions. In one embodiment, a call monitor system 104 may receive notification that a call has been routed by the ACD to a representative system 108 whereupon the call monitor system intercepts a live call. In another embodiment, a call monitor system 104 may be given a number for a specific call center 106, which then connects the call monitor system 104 to the call center 106, and provides the call monitor system 104 with access to incoming calls that occur between a customer calling device such as one of calling devices 120 and one of call representative systems 108. In another embodiment, a call monitor system 104 accesses a recorded call that has been saved in a media storage location either at call center 106 or over a network in data repository 114. Call monitor systems 104 may communicate directly with call representative systems 108 and call manager system 110 or may communicate via a computer network, such as a local area network (LAN), wide area network (WAN), an Extranet, virtual private network (VPN), and/or the Web. Information monitored in a call may be in analog or digital form either via a voice system, computer device, or a combination of the above.

Operators of call monitor systems 104 enter scoring or evaluation data onto a web-based monitor form template 116 and save the data to data repository 114 which is accessible to corresponding call centers 106 over the Web. Call monitor systems 104 and/or call representative systems 108 and call manager system 110 may have access to other features of the evaluation services system including searching data repository 114 for completed monitor forms, editing capabilities for completed monitor forms, and report generation. Calls may be recorded and attached to call monitor forms for coaching and feedback purposes if desired.

Call representative systems 108 perform call center activities associated with the type of customer service being performed. For example, a call center may provide help desk functions whereby customers call in for a specific type of information. Another call center may provide assistance with customer billing inquiries. A third type of call center may schedule service repairs and troubleshooting activities. The ACD and/or the phone number or text address may provide some of the routing functionality in determining which call center is to be contacted. Call representative systems 108 may comprise general-purpose computer devices such as workstations and/or telephones.

Call manager system 110 is operated by a manager or supervisor for the call center who oversees the monitoring activities of the call representatives and acts as a liaison between the call center 106 and the business enterprise 102. Call manager system 110 may comprise any web-enabled, general-purpose computer devices such as a workstation and executes email software for communicating with business enterprise 102. Call manager system 110 accesses completed monitor forms stored in data repository 114 for use in training and evaluating call center representatives.

Server 112 executes the evaluation services system as well as web server software and includes email capabilities. Server 112 is in communication with business enterprise 102, call monitor systems 104, and call center 106 via any communications network. Server 112 transmits monitor form templates 116 to call monitor systems 104 via the Web and receives completed monitor forms from monitor systems 104. Server 112 automatically generates and transmits emails to call center 106 when certain criteria are met during a monitoring session. This feature is described further herein. Server 112 may comprise any suitable high-speed processor or mainframe capable of handling the volume of monitoring activities performed by the evaluation services system.

Data repository 114 stores completed monitor forms and reports 118 generated by the evaluation services system. Data repository 114 comprises any electronic storage medium that is logically addressable to call center 106 and business enterprise 102.

Calling devices 120 are operated by customers of business enterprise 102. Calls may be in the form of audio that is placed by telephone over a public switched telephone network (PSTN) to a private branch exchange (PBX) in the call center 106. The ACD then communicates with the PBX and distributes the call to a call representative system 108. Where a calling device is a desktop computer, laptop, or portable handheld device, a data transmission is sent over a computer network such as the Internet and processed by the multi-media ACD. The calling devices 120, whether digital text-based or voice analog, can transmit calls to calling center 106 over a wireless and/or wireline network as will be understood by those skilled in the art.

Monitor form templates 116 reside in a database in data repository 114. Monitor form templates 116 are tailorable to reflect a prescribed set of initiatives directed to a specific type of customer service. Initiatives provided in monitor form templates 116 may be directed to a help desk service, customer billing, service and repair, sales, or other suitable service. The evaluation services system may be configured with a hover function that allows a call monitor or call representative to gather additional information about a particular initiative by placing a cursor on the desired initiative causing a general description of the initiative to appear on the computer screen. Additionally, by clicking on the initiative, a more detailed description of the initiative may be presented to the user on the computer screen.

Monitor reports 118 are generated by the evaluation services system in response to requests from authorized individuals from call center 106 and/or business enterprise 102. A variety of reporting information can be accessed using these reports and are described in FIG. 2.

Alternate embodiments include outsourcing the evaluation services system activities to third party vendors whereby call monitor systems 104 are operated by a call monitor vendor system 102 rather than the business enterprise. Communication between call monitor vendor system 102 and call center 106 may occur via a secure Extranet architecture. In this embodiment, call center 106 may be manned by individuals of the business enterprise, by a third party vendor, or a combination thereof.

Alternate embodiments include a global business enterprise 102 whereby call monitoring is not outsourced to third parties but is instead conducted by internal divisions of the enterprise that are geographically dispersed. Call centers 106 are operated by employees of the business enterprise and may be in direct communication with the business enterprise via a secure Intranet network architecture. A server 112 is operated by the business enterprise, and may be located in a central or corporate office along with data repository 114. Server 112 may be accessible to authorized individuals of the business enterprise via a secure network architecture.

The evaluation services system allows an authorized call monitor to select live or recorded calls for monitoring, as well as provides searching functions for previously completed monitor sessions. Web-based monitor form templates are retrievable over the Web for call monitors to enter data about the call sessions. The evaluation services system further allows authorized individuals to generate and view reports, as well as perform certain administrative functions. In the computer screen 200 of FIG. 2, a sample main menu is provided illustrative the various options available to an authorized user. A user may select call monitoring 202, call search 204, reports 206 and administrative 208 functions as described herein. The call monitoring function 202 is described in FIG. 3.

Figure 2:
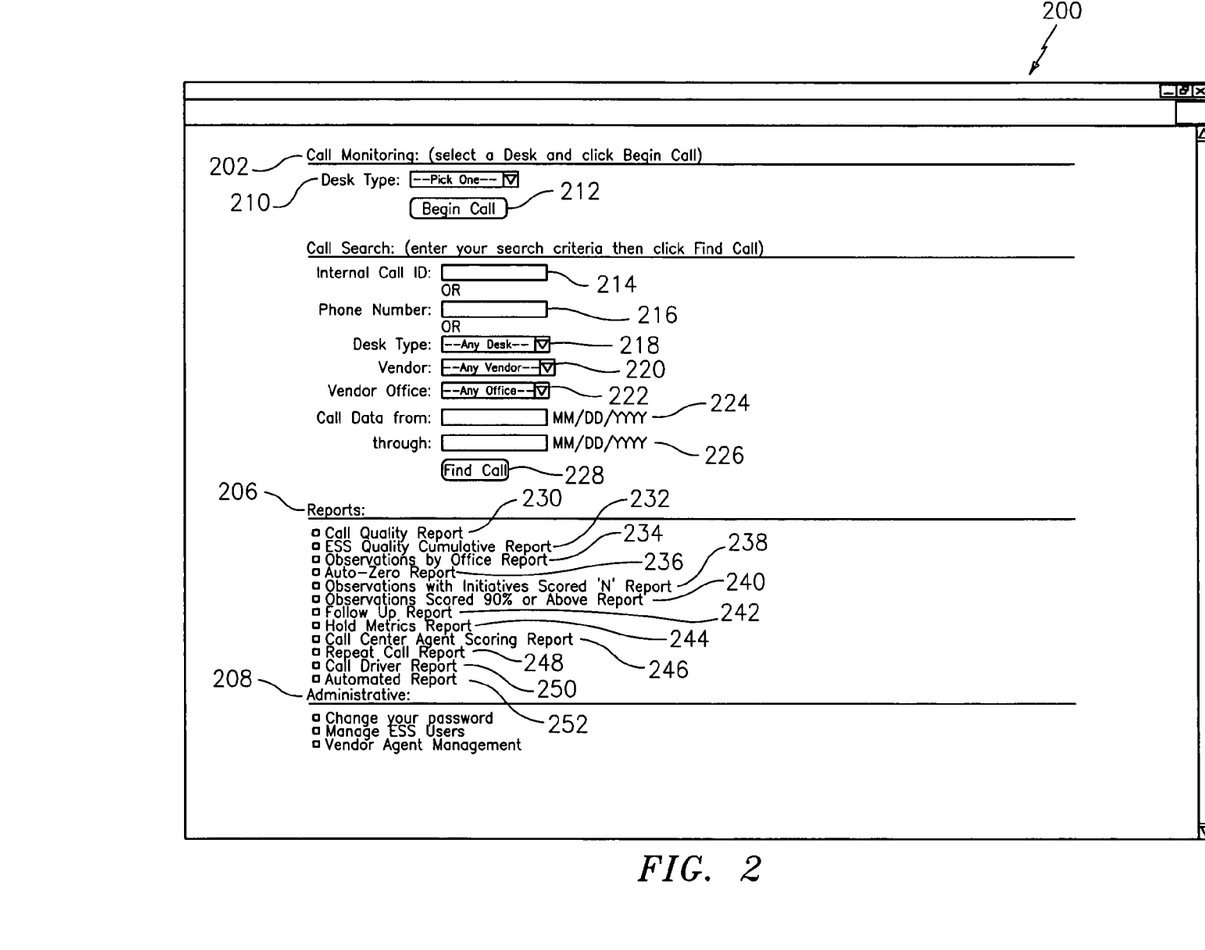
FIG. 2 is a sample screen display on a call monitor system illustrating options available via the main menu of the evaluation services system in exemplary embodiments.

The call search 204 function allows an individual to retrieve a completed monitor form for a previously conducted call monitoring session. The evaluation services system is preferably configured to permit only authorized users to view these completed monitored forms. For example, a call monitor may be authorized to view only those completed monitored forms for which the call monitor authored. Likewise, a call representative may have access to completed call monitor forms where the evaluation was performed on him/her. A manager of the call representative may have access to completed call monitor forms for all subordinates.

An individual may initiate a call search by internal call ID 214, customer phone number 216, or service type 218. Internal call ID 214 refers to a unique identifier assigned to a customer call. Further, an individual may search for all calls associated with a specific vendor 220, vendor office 222, and may select all calls occurring within a specified date range 224, 226. Once the criteria has been selected, the individual depresses the 'find call' button 228 whereby the evaluation services system retrieves the associated completed monitor form(s) from data repository 114 and presents them to the individual via the Web.

Call reports 206 function allows authorized individuals to generated customized reports based upon information entered in completed call monitoring forms. Examples of some report types are listed below.

A Call Quality Report 230 provides a summary of how a group of individuals associated with a specific customer service, complies with a set of initiatives that correspond with that customer service. For example, where 2,000 calls were monitored for a help desk that spans one or more vendor call centers, 500 of these calls were answered with an incorrect greeting. In the nonconformance areas of the call quality report, a user can click on an initiative and the evaluation services system will display common causes and common solutions for that initiative.

A Quality Cumulative Report 232 provides an overview of scores by vendor, location, and manager, regardless of the type of customer service provided. This report can be generated to show results over a given time period.

Observations by Office Report 234 allows a user to view observations completed for a specific individual over a period of time.

Auto-Zero Report 236. Certain initiatives can be classified as critical in that they should be followed by call representatives to ensure a minimum level of quality assurance. For example, a customer repair representative schedules an in-home repair service for a customer and fails to inform the customer of the fees for this service. If the initiative is flagged by the call monitor for a session, the monitor form will reflect a 'zero' score indicating a critical error was made during the call. The evaluation services system retrieves the monitor forms where the critical initiative has been flagged and presents the data in this report.

Observations with Initiatives Scored 'N' Report 238. This report provides information regarding which initiatives are not being complied with as a whole based upon a pass/fail score. The report lists all calls by vendor and subgrouped by calls with an attribute score of 'NO.'

Observations Scored 90% or Above Report 240. This report provides information regarding the calls that have passed the scoring criteria used in monitoring the call centers.

Follow Up Report 242. Where a call monitor determines that a follow up call to a customer is required, the call monitor checks the monitor form to indicate the follow up as well as the time for following up in order to track ongoing issues and resolutions.

Hold Metrics Report 244 provides information regarding the average on-hold time a customer is placed on hold throughout the call. This information can be sorted by call representatives.

Call Center Agent Scoring Report 246 allows a user to view call data by agent or vendor and may sort the information by date.

Repeat Call Report 248 allows a call monitor to select a call by customer for anticipated future activity. This is helpful in situations where chronic or persistent problems or issues arise with a particular customer.

Call Driver Report 250 allows a user to analyze the reasons customers are calling. The report provides statistical data of why customers have called (e.g., hardware problems, software problems, email issues, etc.)

Automated report 252 provides a summary of all calls rated 100% and/or 0%. In these cases, an automatic email may be generated and transmitted to the relevant call center manager who is responsible for the call representative.

Administrative function 208 allows an individual to change a password, manage evaluation services system users, and manage vendor agents.

Figure 3:
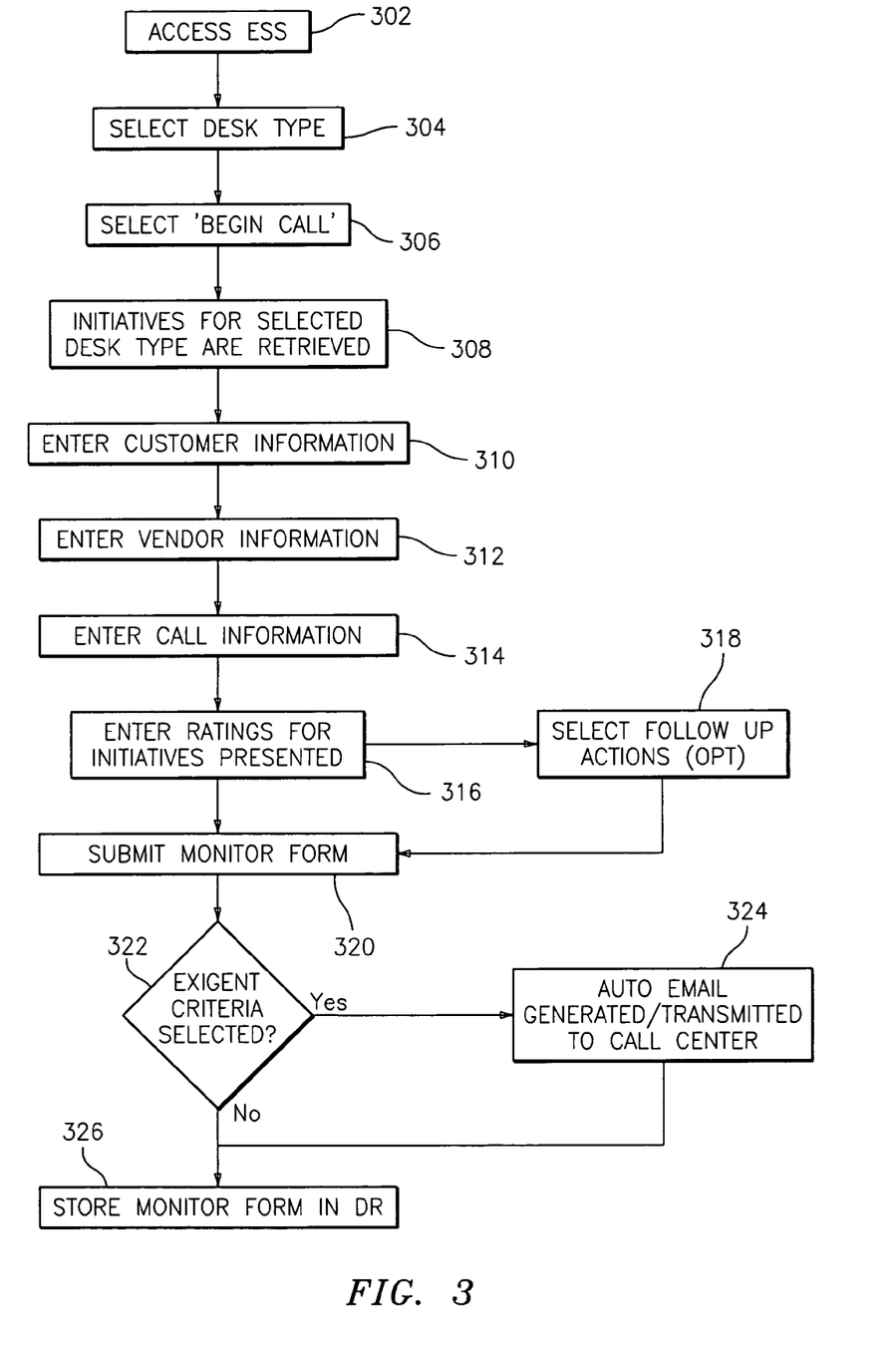
FIG. 3 is a flowchart describing the process of initiating a call monitoring function of the evaluation services system in exemplary embodiments.
Figure 4A:
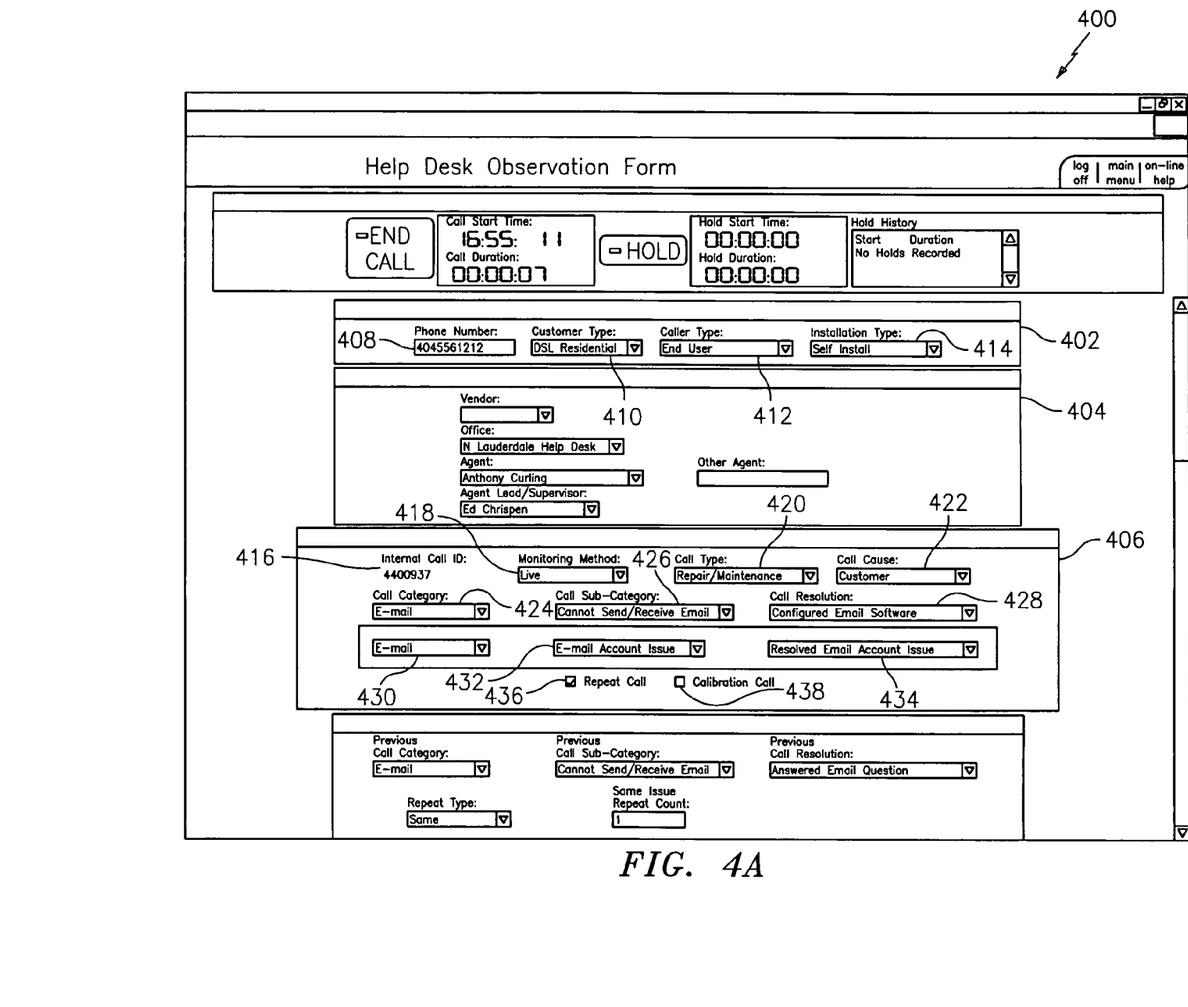
FIGS. 4A–4B are sample screen displays on a call monitor system illustrating a call monitor form template provided by the evaluation services system in exemplary embodiments.
Figure 4B:
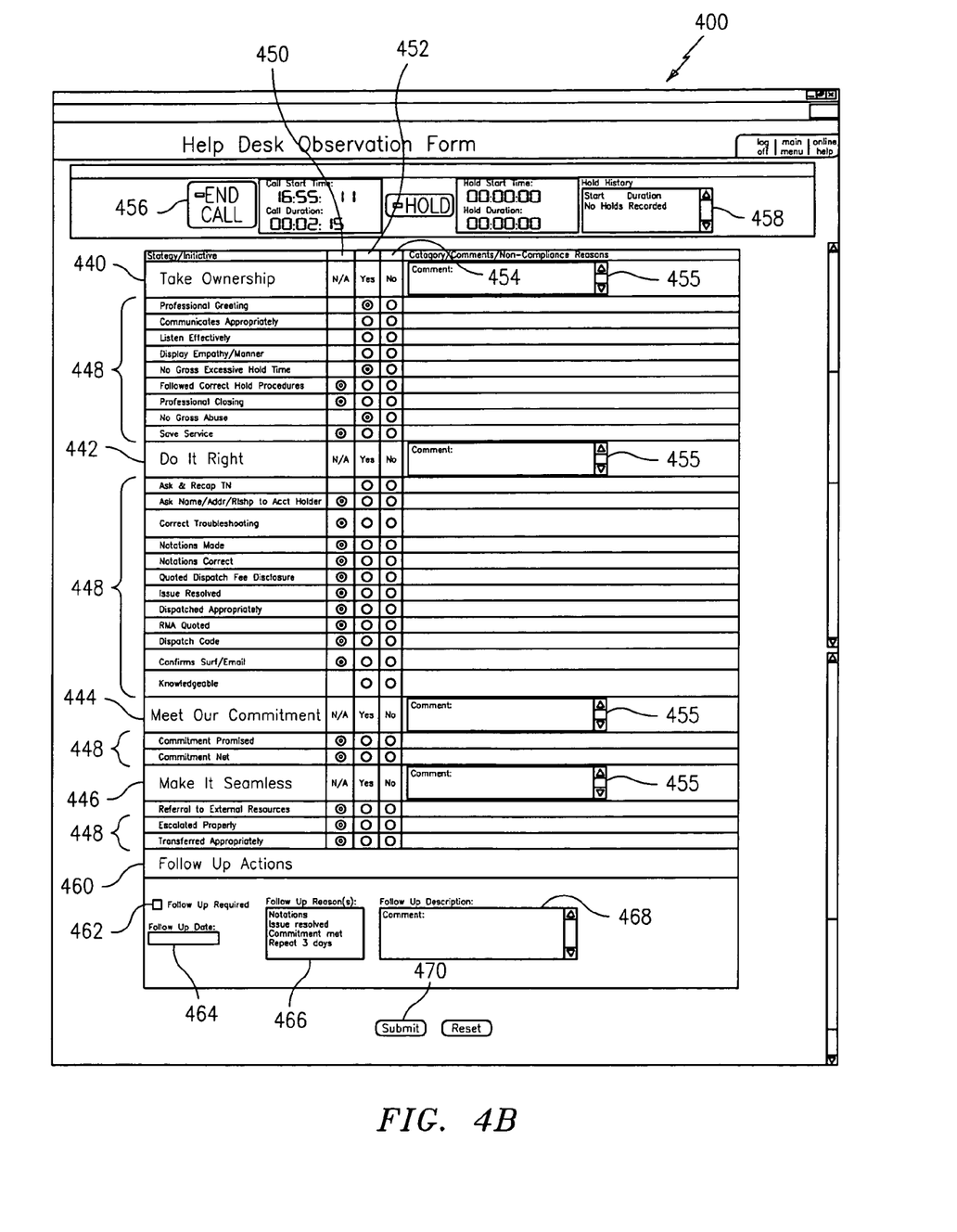

As indicated above, the evaluation services system allows an authorized call monitor to evaluate live or recorded calls via a Web-based scoring application. FIG. 3 describes the process of utilizing the Web-based evaluation services system solution for scoring monitored calls. Steps 302–312 relate to computer screen 400 of FIG. 4A. A call monitor accesses the evaluation services system over a network at step 302 and selects the desk type (also referred to as service type) function 210 of call monitoring function 202 at step 304. A drop down box allows the user to select a service type. The individual selects "begin call" 212 at step 306. The evaluation services system retrieves the appropriate monitor form template 116 associated with the initiatives established for the customer service type 210 and presents the monitor form template 116 to the user via a computer screen window 400 at step 308 as shown in FIGS. 4A–4B. The operator of call monitor system 104 and/or the caller representative system 108 enters customer information 402 to identify the customer to be monitored at step 310. Customer information includes a customer phone number 408, a customer type 410, a caller type 412, and an installation type 414. Customer type 410 allows a call monitor or call representative to distinguish between residential and business customers as well as identify the specific service associated with the call where more than one service type is provided by the business enterprise. Examples of service types include PBX phone services and DSL. A caller type 412 allows a call monitor and/or call representative to distinguish between callers who are employees of the business enterprise or third party vendor system and callers who are non-employee customers. Installation type 414 allows a call monitor and/or call representative to identify whether a 'professional installation' or 'customer installation' occurred with respect to the subject matter of the call. Installation type 414 further allows a call monitor and/or call representative to identify whether an installation was performed via CD-ROM or was manually performed.

The operator of call monitor system 104 then enters information 404 regarding the vendor associated with the calling center to be monitored at step 312. The operator further enters call information 406 at step 314. Call information 406 includes a call ID 416, a monitoring method 418, a call type 420, a call cause 422, a call category 424, a call subcategory 426, a call resolution 428, and CRM call category 430, CRM call sub-category 432, and CRM call resolution 434.

Call ID 416 identifies a particular call session. Every call received by a calling system 120 has a unique call ID 416 associated with it. Data in fields 418–428 is entered by a call monitor while evaluating a call representative. The data in fields 430–434 is entered by a call representative while communicating with a customer. The call monitoring method 418 includes a 'live' option and a 'recorded' option whereby the call monitor selects a live call or a recorded call to monitor. Call type 420 allows calls to be classified in one of four ways: activation, maintenance, misdirected, misdirected/handled. Activation refers to a call that is placed before customer installation has occurred. Maintenance refers to call that is placed after installation has occurred. A misdirected call is one that was placed to the wrong service desk and a misdirected/handled call refers to one that was placed to the wrong service desk but handled by the call representative. Call cause 422 allows a call monitor to indicate a problem source. For example, where a customer has forgotten a password, the problem source is on the customer end. Whereas, where a cable was severed during a professional installation, the problem source is the business enterprise. Call category 424 elements vary by service desk. For example, in a help desk service, a call category might be hardware, software, network, etc. Call categories in field 424 may be further classified into sub-category via sub-category 426 if desired. Call resolution 428 allows a call monitor to indicate the solution prescribed for this customer.

Data in fields 430–434 are entered by a call representative and provide a dual system for auditing customer calls. The data entered in CRM blocks 430–434 by the call representative can be used as a check to ensure that call representatives are correctly handling customer calls and correctly classifying and diagnosing customer issues. For example, where a call representative has entered a call category as hardware related but the call monitor has entered the call category as network related, the discrepancy is noted by the evaluation services system for improving customer relationship management between call representatives and customers.

A repeat call function 436 is a tracking function and is checked when a call monitor desires to follow up on a customer issue at a future time. Once selected, a window appears whereby the call monitor may select a future time for following up. When performing a follow up, the call monitor may determine whether the reason for the call is the same as the first or whether the customer is facing a new problem. Calibration call function 438 allows a call monitor to indicate when two call monitors are simultaneously evaluating a call. This situation occurs where call monitors from the business enterprise and call monitors from a third party vendor are sharing call monitoring activities. To ensure that the two monitoring entities are in synch; that is, that their scoring practices are calibrated, a monitor from one entity and a monitor from the other entity will simultaneously monitor a call representative. Each monitor will have a separate call monitor form and by checking the calibration call function 438, the evaluation services system uses only one of the monitor forms in calculating the score for the call representative, thus, eliminating any duplication.

The operator of call monitor system 104 next enters the information provided in computer screen 400 of FIG. 4B in accordance with the observations noted during the monitor session at step 316. Four sample initiatives 440–446 and their corresponding attributes 448 are shown along with sample scoring via evaluation columns 'N/A' 450, 'Yes' 452, and 'No' 454. These evaluation columns allow the call monitor to indicate whether objectives and attributes provided in the initiatives have been satisfied. A comments block 455 is included in the call monitor form template 116 for allowing the call monitor to enter specific comments regarding the observations made as well as for explaining any scores that indicate a non-compliance event has occurred. In addition, selected initiatives can be further exploited by providing pop-up boxes that provide additional detail that allow the call monitor to further describe the reason for the particular rating of the initiative. For example, where a 'professional closing' initiative is marked 'NO', a pop-up box appears with further details such as "did not thank customer for call" or "did not offer additional help." The call monitor then selects the appropriate sub-reason. Also, the evaluation services system includes functionality that ensures maximum response content from a call monitor by displaying an error message when a call monitor has not entered data for selected data fields deemed critical by the business enterprise. In this manner, the monitor form may not be submitted until such critical data fields have been addressed. Initiatives and/or attributes may also be configured so that those initiatives or attributes that are deemed critical to achieving customer satisfaction can be flagged whereby the evaluation services system automatically generates and transmits a notification to the manager system 110 or other supervisory agent where a non-conformance event occurred for use in training the customer representative who caused the non-conformance. Flagging these initiatives and attributes also allows for easy report generation that provides details about the non-conformance and/or non-conformance patterns.

A call timer function 456 is provided via the evaluation services system which tracks the duration of the call and provides insight on the call's hold history. The hold history function 458 may be used by the call monitor to track the amount of time a customer has been placed on hold by the call representative. The call timer function 456 and hold history function 458 may be accomplished using an internal clock feature incorporated into the evaluation services system tool.

At any time during the monitoring session, the call monitor may determine that a follow up monitoring session may be required or desirable where the subject of the call indicates that a matter has not been resolved during the call, or where the call representative has committed to the customer that he/she will follow up with the customer. In this manner, the call monitor may wish to check to see if the call representative in fact followed up with the customer. This follow up feature 460 is performed by checking 'follow up required' 462 at step 318. The call monitor may enter a follow up date in block 464, as well as the follow up reason in block 466, and follow up description in block 468. Once completed, the monitor form is submitted to the evaluation services system application on server 112 via the Web at step 320 by selecting the 'submit' button 470. As described above, if certain exigent or critical criteria have been flagged by the call monitor at step 322, the evaluation services system generates and sends an email or similar notification to the relevant call center manager or other supervisory agent at step 324. The completed monitor form is stored in data repository at step 326.

As can be seen from the above descriptions, various types of customer services are provided by any multi-media communications channels by the evaluation services system. Call monitoring is performed over a network where incoming calls are evaluated. Call monitor systems access the evaluation services system over the World Wide Web (WWW), retrieve monitor form templates based upon initiatives established for the type of call center being monitored, and enter data into the form which is then saved and retrievable via the Web. Reports can be generated and shared via the Web by selected individuals with proper access permissions.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A method for providing quality assessment services over a web-based network via an evaluation services system, said quality assessment services relating to call monitoring, the method comprising:
  presenting a call monitor form template over said web-based network to a call monitor system in response to a request to evaluate a call representative, said call monitor form template comprising:
    data entry fields operable for identifying at least one of:
      a call being monitored;
      a customer initiating said call; and
      a call representative receiving said call; and
    initiatives and scoring data fields operable for receiving evaluation data from said call monitor system;
  receiving a completed call monitor form over said web-based network; and
  making said completed call monitor form accessible to authorized individuals over said web-based network.

2. The method of claim 1, further comprising:
  notifying a call center manager when exigent criteria is flagged by a call monitor via said call monitor template.

3. The method of claim 1, further comprising:
  flagging an initiative wherein said evaluation services system automatically assigns an overall failing score for a call session when a data entry field associated with said initiative indicates a nonconformance.

4. The method of claim 1, wherein said receiving a completed call monitor form over said web-based network includes receiving a recording of a call session by electronic attachment, said recording corresponding to said call session.

5. The method of claim 1, wherein said call monitoring includes listening in on a communication between a consumer and a call representative, said communication occurring via at least one of:
  a telephone;
  a computer;
  a mobile communications device.

6. The method of claim 5, wherein said communication is live.

7. The method of claim 5, wherein said communication is pre-recorded.

8. The method of claim 1, wherein said data entry fields for identifying a call includes at least one of:
  a monitoring method;
  a call cause;
  a call type;
  a call category;
  a call sub-category; and
  a call resolution.

9. The method of claim 1, wherein call types include:
  activation;
  maintenance;
  misdirected; and
  misdirected but handled.

10. The method of claim 8, wherein said call category indicates whether a customer problem has occurred due to customer error or enterprise error.

11. The method of claim 8, wherein duplicate data entry fields for said call category, said call sub-category, and said call resolution are also presented to said call monitor, wherein data entered in said data entry fields are compared with data entered in said duplicate data entry fields operable for evaluating whether a call representative has correctly identified a customer issue.

12. The method of claim 1, wherein said data entry fields for identifying a customer include at least one of:
  a customer phone number;
  a customer type;
  a caller type; and
  an installation type.

13. The method of claim 1, wherein said initiatives include criteria for evaluating a call representative, said criteria associated with a service type selected by said call monitor system.

14. The method of claim 13, wherein said service type includes at least one of:
  a service desk;
  a repair desk;
  a billing desk; and
  a sales desk.

15. The method of claim 1, further comprising providing a follow up function operable for enabling a call monitor to reevaluate a call representative, said follow up function activated via a follow up field on said call monitor form, wherein when said follow up field is checked, a call monitor is queried to provide details on a time and a reason for said follow up.

16. The method of claim 1, further comprising:
presenting a completed call monitor form over said web-based network to an authorized individual; and
receiving edited data via said completed call monitor form, said edited data entered by said authorized individual.

17. The method of claim 1, further comprising:
generating a report using criteria selected by an authorized individual and data contained in at least one completed call monitor form, said criteria including at least one of:
scores by location;
scores by vendor;
scores by manager
scores by a time period;
scores for an individual call representative;
scores where a non-compliance occurred; and
average on hold time.

18. The method of claim 1, further comprising:
tracking call hold time associated with a call session.

19. A web-based system for providing quality assessment services, said quality assessment services relating to call monitoring, the web-based system comprising:
a call representative system in communication with a calling system;
a call monitor system in communication with said call representative system;
an evaluation services application executing on a server in communication with said call monitor system, said evaluation services application including a call monitor template comprising:
data entry fields operable for identifying at least one of:
a call being monitored;
a customer initiating said call; and
a call representative receiving said call; and
initiatives and scoring data fields operable for receiving evaluation data from said call monitor system; and
a data repository in communication with said server, said data repository storing completed call monitor forms.

20. A storage medium comprising machine-readable computer program code for providing quality assessment services over a web-based network via an evaluation services system, said quality assessment services relating to call monitoring, the storage medium including instructions for causing a computer to implement a method comprising:
presenting a call monitor form template over said web-based network to a call monitor system in response to a request to evaluate a call representative, said call monitor form template comprising:
data entry fields operable for identifying at least one of:
a call being monitored;
a customer initiating said call; and
a call representative receiving said call; and
initiatives and scoring data fields operable for receiving evaluation data from said call monitor system;
receiving a completed call monitor form over said web-based network; and
making said completed call monitor form accessible to authorized individuals over said web-based network.

21. The storage medium of claim 20, further comprising instructions for causing said computer to implement:
notifying a call center manager when exigent criteria is flagged by a call monitor via said call monitor template.

22. The storage medium of claim 20, further comprising instructions for causing said computer to implement:
flagging an initiative wherein said evaluation services system automatically assigns an overall failing score for a call session when a data entry field associated with said initiative indicates a nonconformance.

23. The storage medium of claim 20, wherein said receiving a completed call monitor form over said web-based network includes receiving a recording of a call session by electronic attachment, said recording corresponding to said call session.

24. The storage medium of claim 20, wherein said call monitoring includes listening in on a communication between a consumer and a call representative, said communication occurring via at least one of:
a telephone;
a computer;
a mobile communications device.

25. The storage medium of claim 24, wherein said communication is live.

26. The storage medium of claim 24, wherein said communication is pre-recorded.

27. The storage medium of claim 20, wherein said data entry fields for identifying a call includes at least one of:
a monitoring method;
a call cause;
a call type;
a call category;
a call sub-category; and
a call resolution.

28. The storage medium of claim 20, wherein call types include:
activation;
maintenance;
misdirected; and
misdirected but handled.

29. The storage medium of claim 27, wherein said call category indicates whether a customer problem has occurred due to customer error or enterprise error.

30. The storage medium of claim 27, wherein duplicate data entry fields for said call category, said call sub-category, and said call resolution are also presented to said call monitor, wherein data entered in said data entry fields are compared with data entered in said duplicate data entry fields operable for evaluating whether a call representative has correctly identified a customer issue.

31. The storage medium of claim 20, wherein said data entry fields for identifying a customer include at least one of:
a customer phone number;
a customer type;
a caller type; and
an installation type.

32. The storage medium of claim 20, wherein said initiatives include criteria for evaluating a call representative, said criteria associated with a service type selected by said call monitor system.

33. The storage medium of claim 32, wherein said service type includes at least one of:
a service desk;
a repair desk;
a billing desk; and
a sales desk.

34. The storage medium of claim 20, further comprising instructions for causing said computer to implement:

providing a follow up function operable for enabling a call monitor to reevaluate a call representative, said follow up function activated via a follow up field on said call monitor form;

wherein when said follow up field is checked, a call monitor is queried to provide details on a time and a reason for said follow up.

35. The storage medium of claim 20, further comprising instructions for causing said computer to implement:

presenting a completed call monitor form over said web-based network to an authorized individual; and receiving edited data via said completed call monitor form, said edited data entered by said authorized individual.

36. The storage medium of claim 20, further comprising instructions for causing said computer to implement:

generating a report using criteria selected by an authorized individual and data contained in at least one completed call monitor form, said criteria including at least one of:

scores by location;

scores by vendor;

scores by manager scores by a time period;

scores for an individual call representative;

scores where a non-compliance occurred; and average on hold time.

37. The storage medium of claim 20, further comprising instructions for causing said computer to implement:

tracking call hold time associated with a call session.

* * * * *